United States Patent Office 3,049,428
Patented Aug. 14, 1962

3,049,428
MEAT PACKAGING PROCESS
Ervin W. Hopkins, Hinsdale, and Leonard J. Zimont, Addison, Ill., assignors, by mesne assignments, to Armour & Company, Chicago, Ill., a corporation of Delaware
No Drawing. Filed Mar. 25, 1959, Ser. No. 801,715
11 Claims. (Cl. 99—174)

Our invention relates to meat packaging and display. More particularly, our invention relates to a process for reducing fluid exudation in small cuts of meat by contacting such cuts with a salt solution prior to packaging and display.

At the present time, substantially all small cuts of meat sold in self-service stores must be hand packaged at the sale site just prior to sale because small cuts of meat, especially beef, exude unsightly tissue fluids on storage. This fact forces the vendor to package small lots of meat just prior to sale and to repackage older cuts in order to give them eye appeal. As all of the packaging is done in small lots and by hand, the cost of the meat is relatively high.

The packing industry has done considerable reserach on this problem because great competitive advantage would accrue to the packer who could machine package small cuts of meat on plant scale operation. This research has been handicapped considerably because there is little or no understanding of the reasons for tissue fluid exudation, especially exudation from intact cell tissue.

We have now discovered that unsightly tissue exudation can be substantially reduced where small cuts of meat are prepackaged for sale in self-service stores by dipping the small cuts of meat in sodium chloride solutions containing certain phosphates prior to packaging.

Our invention is directed to reducing tissue exudation in small cuts of the meat of animals such as cattle (beef), sheep (mutton), swine (pork), goats, deer (venison), etc. Our invention is also applicable to the packaging of the meat of poultry such as chickens, ducks, turkeys, etc. The size of the cuts will vary with the animal, but generally cuts of fresh meat ranging from about ¼ to about 8 pounds are usually protected by the process of our invention. Some cuts of poultry will, of course, weigh less than this and some cuts of meat, such as large roasts, will weigh more.

Our process consists essentially of dipping a small cut of meat in an aqueous solution of about 10 to about 20% by weight of sodium chloride and from about 0.5 to about 5% by weight of a phosphate salt and draining the excess solution from the cut of meat prior to wrapping the meat in a transparent, flexible moisture-impervious film.

The length of treatment will depend upon two variables, i.e., the weight of the meat and the concentration of the sodium chloride and phosphate in the solution. Where solutions contain a relatively high concentration of sodium chloride and a phosphate and the cut of meat or poultry is on the order of less than about 0.25 to about 0.5 lb., dipping times of about 5 to about 10 seconds are about all that are required. On the other hand, a large roast may require a dip time of up to about 10–15 minutes depending upon the concentration of the solution. We prefer to utilize aqueous solutions containing from about 15 to about 20% by weight sodium chloride and from about 1 to about 2% by weight tertasodium pyrophosphate. Generally speaking, other suitable phosphates include the sodium, potassium and ammonium salts of pyrophosphoric acid, orthophosphoric acid and the polyphosphoric acids. Such salts include sodium hexametaphosphate, disodium orthophosphate, tetrapotassium pyrophosphate, ammonium acid pyrophosphate, etc.

It may be desirable to add color-improving agents such as sodium nicotinate and ascorbic acid to the dipping solution. A concentration of about 0.1 to about 1.0% by weight of each of these compounds is generally sufficient to achieve the desired color effect.

Transparent plastic films which can be utilized in wrapping fresh cuts of meat treated by the process of our invention include the generally known and used transparent, flxible moisture-imprevious films. These include cellophane; Saran, a vinylidene chloride polymer; vinylidene chloride acetate polymers; cellulose acetate films; relatively clear polyethylene films; polyvinyl chloride films; etc.

The following specific examples more fully illustrate our invention, but it is not intended that our invention be limited to the meats, solutions or exact processes set out therein; but rather it is intended that all equivalents obvious to those skilled in the art be included within the scope of our invention.

Example I

A boneless strip loin was sliced into steaks ¾ inch thick. Alternating steaks were immersed in a water solution of 15% table salt and 1% tetrasodium pyrophosphate by weight. After 30 seconds, the steaks were removed, left on a tray to drain for a few minutes, and then placed on pieces of cellophane intended for use with fresh meat. A piece of chip board, utilized as a stiffer backing for the packaged meat, was placed on the steak, the cellophane drawn over the meat, and the film laps heat-sealed over the chip board. The remaining untreated steaks were packaged in the same manner and all steaks placed with the chip board up on a tray and held for 2 hours in this position and then turned over.

On the following morning, there were small areas, perhaps 0.5 in.$^2$ total, of reddish fluid on the chip boards under the untreated steaks, and barely preceptible fluid with those steaks dipped in the salt-pyrophosphate solution. After several days' storage, the fluid increased in the control steak package to a total area of approximately 1 in.$^2$, but the treated steaks remained about the same as on the first day.

Example II

Porterhouse steaks 1½ in. thick were dipped in a solution of 12% salt and 1.5% tetrasodium pyrophosphate for 45 seconds, drained and wrapped as in Example I. Untreated control steaks were prepared at the same time. The area of drip fluid visible on the chip board of the control steaks was about 1.5 in.$^2$, and that of the treated steaks, about 0.25 in.$^2$.

Example III

Round steak 1 in. thick in pieces weighing about 10 oz. was dipped in a solution of 16% salt, 2% tetrasodium pyrophosphate, 0.22% sodium nicotinate, and 0.22% ascorbic acid for a period of 2 minutes, drained and wrapped by the procedure of Example I. Similar pieces were reserved as controls. Beginning with the first day, there was an appreciable amount of free fluid in the package of control steaks. The treated steaks, by contrast, remained relatively free of fluid. Addition of the sodium nicotinate and ascorbic acid brought about retention of a brighter red color up to a period of one week.

Example IV

Pork chops were wrapped after dipping for 30 seconds in a solution of 15% salt and 1% sodium tripolyphosphate. Although the drip fluid from the control chops was a small amount, the treated chops had even less fluid present in the package.

Example V

A top-round roast was held in a solution of 20% salt and 2% tetrasodium pyrophosphate for 4 minutes and then drained and wrapped in transparent Saran film. Fluid appeared in both the treated and control meat packages, but at all times there was several-fold more fluid in the untreated meat. After one week, the control package contained 10.5 cc. of fluid and the treated meat 2.1 cc.

Now having described our invention, what we claim is:

1. In a process for reducing pre-cooking fluid loss in packaged cuts of fresh meats, the step which comprises contacting, prior to packaging, the meat with an aqueous solution of from about 10 to about 20% by weight sodium chloride and from about 0.5 to about 5% of the phosphate salt selected from the group consisting of the sodium, potassium and ammonium salts of poly, ortho, meta and pyro phosphoric acids for a period ranging from about 5 seconds to about 15 minutes.

2. The process of claim 1 wherein from about 0.1 to about 1.0% by weight of sodium nicotinate and ascorbic acid are included in the aqueous solution.

3. The process of claim 1 wherein the sodium chloride is present in concentrations from about 15 to about 20% by weight and the phosphate is present in concentrations ranging from about 1 to about 2% by weight.

4. A process for reducing pre-cooking fluid loss in packaged meat which comprises dipping; for a period of time ranging from about 5 seconds to about 15 minutes, depending upon the weight of the meat cut; fresh cuts of meat ranging from about 0.25 to about 8 lbs. by weight in an aqueous solution containing from about 10 to about 20% by weight sodium chloride and from about 0.5 to about 5% of a phosphate salt selected from the group consisting of the sodium, potassium and ammonium salts of poly, ortho, meta and pyro phosphoric acids, draining excess solution from said fresh cuts of meat, and wrapping said fresh cuts of meat in transparent, flexible moisture-impervious film.

5. The process of claim 4 wherein the aqueous solution contains from about 0.1 to about 1% by weight of sodium nicotinate and ascorbic acid.

6. The process of claim 4 wherein the meat cut is beef.

7. The process of claim 4 wherein the meat cut is pork.

8. The process of claim 4 wherein the meat cut is venison.

9. The process of claim 4 wherein the meat cut is mutton.

10. The process of claim 4 wherein the meat cut is goat.

11. The process of claim 4 wherein the meat cut is poultry.

References Cited in the file of this patent

UNITED STATES PATENTS

| | | |
|---|---|---|
| 2,513,094 | Hall | June 27, 1950 |
| 2,596,067 | Brissey | May 6, 1952 |
| 2,812,261 | Wasserman | Nov. 5, 1957 |
| 2,852,392 | Huber et al. | Sept. 16, 1958 |
| 2,863,777 | Dekker | Dec. 9, 1958 |

FOREIGN PATENTS

| | | |
|---|---|---|
| 696,617 | Great Britain | Sept. 2, 1953 |
| 7,670/32 | Australia | June 2, 1932 |

OTHER REFERENCES

"Food Technology," 1956, vol. X, No. 11, pp. 546 to 552, inclusive, article entitled The Action of Phosphates In Sausage Products, by C. E. Swift et al.